United States Patent
Matsushima

(10) Patent No.: US 6,862,106 B1
(45) Date of Patent: Mar. 1, 2005

(54) IMAGE-CAPTURING APPARATUS, METHOD OF CONTROLLING THE SAME APPARATUS, AND COMPUTER PROGRAM PRODUCT FOR PROVIDING THE SAME METHOD

(75) Inventor: Hiroshi Matsushima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 861 days.

(21) Appl. No.: 09/604,980

(22) Filed: Jun. 28, 2000

(30) Foreign Application Priority Data

Jun. 30, 1999 (JP) .......................................... 11-184991

(51) Int. Cl.$^7$ ............................ H04N 1/21; G06F 12/00
(52) U.S. Cl. ...................... 358/1.17; 358/404; 358/444; 348/231.1; 348/231.9
(58) Field of Search ............................ 358/1.16–1.17, 358/404, 444, 452, 463; 348/231.3, 231.6, 234, 231, 231.1, 231.9, 231.99; 382/264, 266, 275, 167, 274

(56) References Cited

U.S. PATENT DOCUMENTS

| | | | |
|---|---|---|---|
| 5,481,303 A | | 1/1996 | Uehara ..................... 348/231.1 |
| 5,633,976 A | * | 5/1997 | Ogino ........................ 386/120 |
| 6,075,889 A | * | 6/2000 | Hamilton et al. ........... 382/167 |
| 6,192,162 B1 | * | 2/2001 | Hamilton et al. ........... 382/266 |
| 6,239,837 B1 | * | 5/2001 | Yamada et al. ........... 348/231.5 |
| 6,249,313 B1 | * | 6/2001 | Nishi ....................... 348/231.9 |
| 6,256,063 B1 | * | 7/2001 | Saito et al. ............. 348/231.99 |
| 6,542,187 B1 | * | 4/2003 | Hamilton et al. ........... 348/234 |
| 6,697,107 B1 | * | 2/2004 | Hamilton et al. ........... 348/234 |
| 2001/0000969 A1 | * | 5/2001 | Ohta et al. .................. 348/231 |

FOREIGN PATENT DOCUMENTS

| | | |
|---|---|---|
| JP | 06-350950 | 12/1994 |
| JP | 07-099629 | 4/1995 |
| JP | 08-032912 | 2/1996 |
| JP | 2000-083210 | 3/2000 |

* cited by examiner

*Primary Examiner*—Scott A. Rogers
(74) *Attorney, Agent, or Firm*—Fitzpatrick, Cella, Harper & Scinto

(57) ABSTRACT

In an apparatus which captures a photographic image, stores the captured image in an image storage device, reads the image stored in the image storage device, and records the read image on a recording medium, in a method for controlling such an apparatus, and in a computer program product for providing such a control method, an adjustment value of exposure is displayed with a bar-type indication before shooting and the number of images which can be stored in the image storage device is displayed within a predetermined time after shooting, and the display of the number of images which can be stored in the image storage device is changed according to the number of images which can be recorded in the recording medium.

3 Claims, 9 Drawing Sheets

DISPLAY HAS STARTED BLINKING

DISPLAY HAS STARTED BLINKING

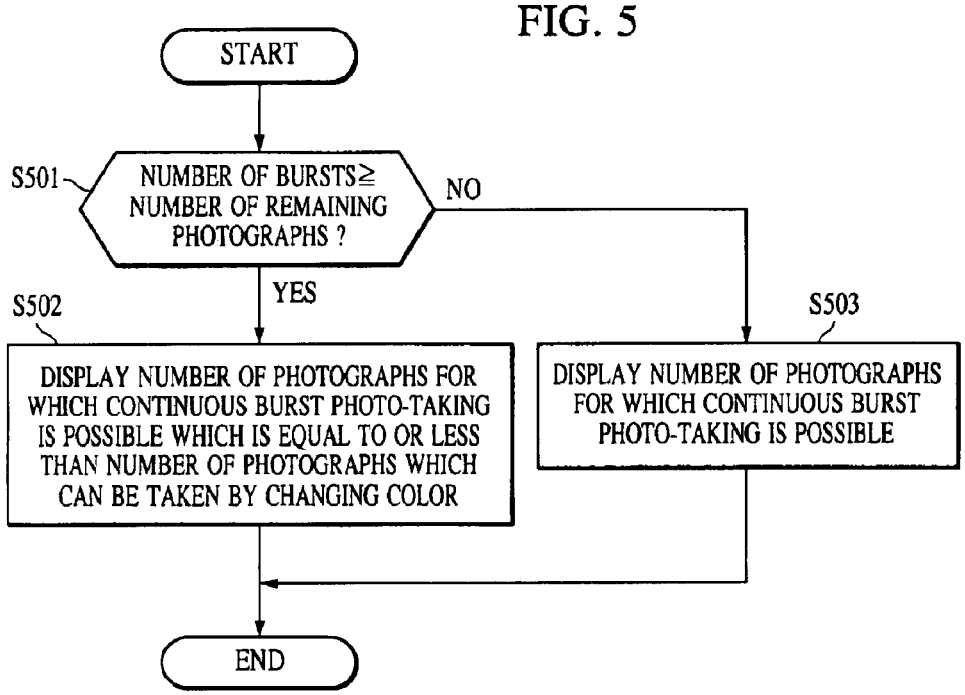
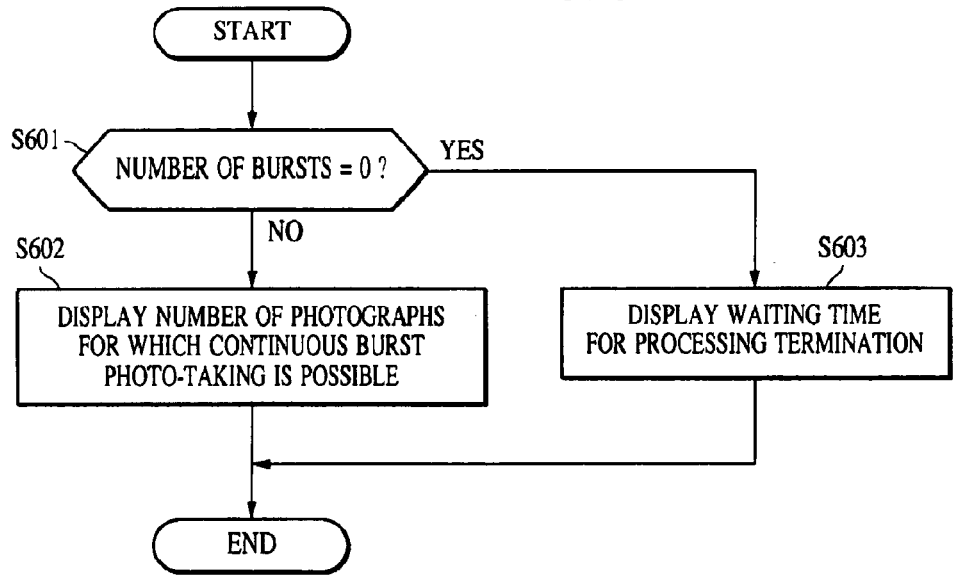

IMAGE-CAPTURING APPARATUS, METHOD OF CONTROLLING THE SAME APPARATUS, AND COMPUTER PROGRAM PRODUCT FOR PROVIDING THE SAME METHOD

BACKGROUND OF THE INVENTION

1. Field of the Invention

The present invention relates to an image-capturing apparatus, such as an electronic still camera, for converting an optical image into an electrical image signal by a photoelectric conversion device and for recording the electrical image signal on a recording medium, and relates to a method of controlling the image-capturing apparatus, and to a computer program product for providing the method of controlling the image-capturing apparatus.

2. Description of the Related Art

Some models of conventional image-capturing apparatuses, such as electronic still cameras, are capable of performing burst photo-taking (a photographic image is temporarily stored in a buffer memory, etc., time-consuming image processing and image compression are performed when there is time, and the photographed image is recorded (stored) on a recording medium, thus increasing the frame speed of continuous photo-taking). Of those, models which do not display the number of burst frames or which display only the number of burst frames on an external display have been commercially available, but there are no models which produce a display which clearly shows the number of photographs which can be taken and the number of frames of burst photo-taking or which produce the display in which a burst state is shared with another display. Also, there are no models which clearly display the time remaining until photo-taking again becomes possible when the storage area of a buffer memory is filled up to its limit.

As a result, in the above-described conventional example, there are problems in that the number of photographs for which continuous photo-taking is possible and the state in which the number of remaining photographs which can be recorded on a recording medium cannot be recognized at the same time, it is difficult to know the time when the next photo-taking will be possible, and the burst photo-taking state cannot be displayed unless a dedicated display member is prepared.

SUMMARY OF THE INVENTION

In a first aspect, the present invention provides an apparatus, as well as a method of controlling this apparatus and a computer program product implementing such a method, for capturing a photographic image, storing the captured image in an image storage device, reading the image stored in the image storage device, and recording the read image on a recording medium, wherein the number of images which can be stored in the image storage device is displayed and a display of the number of images which can be stored in the image storage device is changed according to the number of images which can be recorded on the recording medium, whereby the display of the number of images which can be stored in the image storage device can be improved.

In a second aspect the present invention provides an apparatus, as well as a method of controlling this apparatus and a computer program product implementing such a method, for capturing a photographic image, storing the captured image in an image storage device, reading the image stored in the image storage device, and recording the read image on a recording medium, wherein when the number of images which can be stored in the image storage device is zero, a time until an image can be stored in the image storage device is displayed, whereby the display of the number of images which can be stored in the image storage device can be improved.

In a third aspect, the present invention provides an apparatus, as well as a method of controlling this apparatus and a computer program product implementing such a method, for capturing a photographic image, storing the captured image in an image storage device, reading the image stored in the image storage device, and recording the read image on a recording medium, wherein the image-stored state of the image storage device and photo-taking-related information different from the Image-stored state of the image storage device are displayed selectively, whereby the display of the number of images which can be stored in the image storage device can be improved.

The above and further objects, aspects and novel features of the invention will become more fully apparent from the following detailed description when read in conjunction with the accompanying drawings.

BRIEF DESCRIPTION OF THE DRAWINGS

FIG. 5 is a flowchart showing the flow of the operation of an image-capturing apparatus according to a second embodiment of the present invention;

FIG. 6 is a flowchart showing the flow of the operation of the image-capturing apparatus according to the second embodiment of the present invention;

DESCRIPTION OF THE PREFERRED EMBODIMENTS

Preferred embodiments of the present invention will now be described in detail with reference to the accompanying drawings.

(First Embodiment)

A first embodiment of the present invention is described below with reference to FIGS. 1 to 5.

In this embodiment, the number of remaining photographs which can be written into a removable memory and the number of remaining photographs which can be stored in a buffer memory for continuous burst photo-taking are clearly displayed at the same time.

Figure 1:
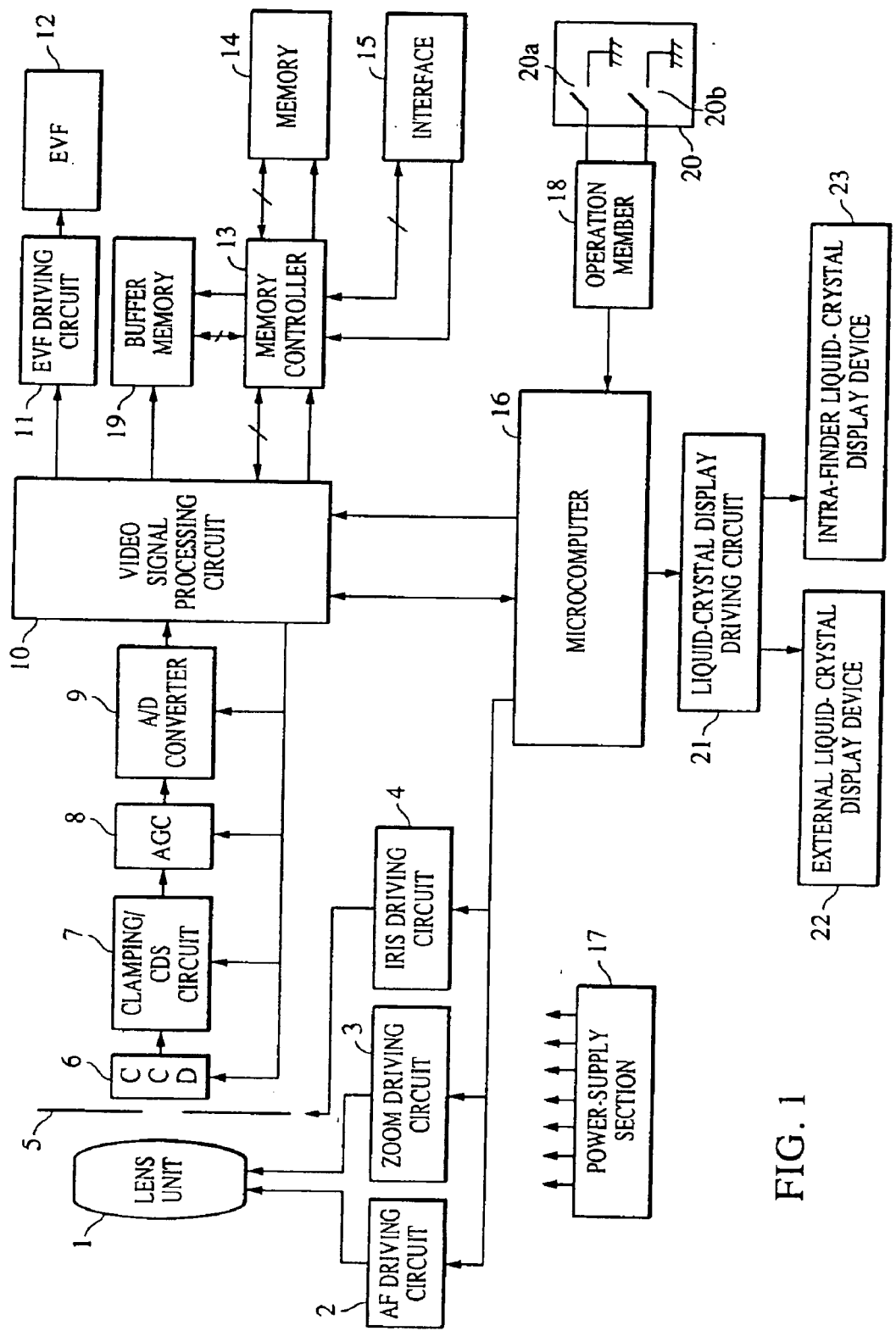
FIG. 1 is a block diagram showing the construction of an image-capturing apparatus according to a first embodiment of the present invention.

FIG. 1 is a block diagram showing the construction of an electronic still camera (film image reproduction to this embodiment.

Referring to FIG. 1, reference numeral 1 denotes a photographic lens unit, and reference numeral 2 denotes an AF (autofocus) driving circuit, which is composed of, for example, a stepping motor, for focusing an image on an image-capturing device 6 by adjusting the focal position of the lens inside the photographic lens unit 1 under the control of a microcomputer 16. Also, reference numeral 3 denotes a zoom driving circuit 3, which is composed of, for example, a stepping motor, for adjusting the focal distance of the photographic lens unit 1 by adjusting a variable-power lens position inside the photographic lens unit 1 under the control of a microcomputer 16. Reference numeral 4 denotes an iris driving circuit, which is composed of, for example, an automatic iris and the like, for adjusting the optical f-stop number by changing an iris 5 under the control of the microcomputer 16.

Reference numeral 6 denotes an image-capturing device, which is composed of, for example, a CCD (charge-coupled device) and the like, for photoelectrically converting an object image formed into an image on the image-capturing device 6 by the photographic lens unit 1 in order to pick up electrical signals. Reference numeral 7 denotes a clamping/CDS (correlation double sampling) circuit for performing a basic analog process before A/D conversion is performed and also for changing the clamping level. Reference numeral 8 denotes an AGC (automatic gain control) apparatus for performing a basic analog process before A/D conversion is performed and also for changing the AGC reference level. Reference numeral 9 denotes an A/D converter for converting an analog output signal of the CCD 6 into a digital signal.

Reference numeral 10 denotes a video signal processing circuit for performing a filtering process, a color conversion process, and a gamma correction process on the digitized image data of the CCD 6 and outputs the resulting data to a memory controller 13. Also, this video signal processing circuit 10 has contained therein a D/A converter which converts a video signal input from the CCD 6 and image data which is input in reverse from the memory controller 13 into an analog signal and which outputs it to an EVF (electronic viewfinder) monitor 12 through an EVF driving circuit 11.

Switching of these functions is performed by the exchange of data with the microcomputer 16, and it is possible to output exposure information, focusing information, white balance, and autofocus information of the output signal of the CCD 6 to the microcomputer 16 as necessary. Based on the information, the microcomputer 16 performs white balance adjustment and gain adjustment. Also, the microcomputer 16 evaluates the autofocus information and communicates It to the AF driving circuit 2 so that the focusing lens inside the photographic lens unit 1 is driven. It is also possible to store image data in a buffer memory 19 through the memory controller 13 without performing any action in accordance with the instructions of the microcomputer 16. The video signal processing circuit 10 also has a function for a compression process, such as JPEG (Joint Photographic Experts Group).

Also, in the case of continuous photo-taking, image data is stored once in the buffer memory 19, and image processing and compression processing by the video signal processing circuit 10, which take time, are performed by reading image data, which is not yet processed, stored in the buffer memory 19 through the memory controller 13, thereby increasing the continuous photo-taking speed without waiting for these processes. The number of photographs of continuous photo-taking depends largely on the size of the buffer memory 19.

In the memory controller 13, the digital image data, which is not yet processed, input from the video signal processing circuit 10 is stored in the buffer memory 19, a processed digital image is stored in a memory 14, or conversely, image data is output to the video signal processing circuit 10 from the buffer memory 19 and the memory 14. Also, it is possible for the memory controller 13 to store a video image sent from an external interface 15 in the memory 14 and to output an image stored in the memory 14 from the external interface 15. There are cases in which the memory 14 can be freely mounted to and removed from the main unit of the display device.

Reference numeral 17 denotes a power-supply circuit which supplies power required for each IC (integrated circuit) and the driving system. Reference numeral 18 denotes an operation member, the operating state thereof being transmitted to the microcomputer 16, and this microcomputer 16 controls each section according to the operating state of the operation member 18. Reference numeral 20 denotes a release button, which is an input switch of the operation member 18, having movable contacts 20a and 20b. When the release button 20 is half-depressed, only one of the movable contacts (contact 20a) is turned on (closed), and when the release button 20 is fully depressed, the contact 20b is turned on, thereby holding and recording a photographic image.

Reference numeral 21 denotes a liquid-crystal display driving circuit which drives an external liquid-crystal display device 22 and an intra-finder liquid-crystal display device 23 in accordance with the display content instructions of the microcomputer 16. Also, in the intra-finder liquid-crystal display device 23, a backlight, such as an LED (light-emitting diode) (not shown), is disposed, and the LED is also driven by the liquid-crystal display driving circuit 21. Also, it is possible for the liquid-crystal display driving circuit 21 to cause specific segments to blink in accordance with instructions from the microcomputer 16. The liquid-crystal display driving circuit 21 also has a function of changing the display color.

A means for converting an optical image into an electric image signal by a photoelectric conversion means comprises the CCD 6, the clamping/CDS circuit 7, the AGC 8, and the A/D converter 9. A storage means for temporarily storing an image comprises the buffer memory 19. A control means for controlling temporary storage of an image in the buffer memory 19 comprises the video signal processing circuit 10 and the memory controller 13. A removable recording medium comprises the memory 14. A control means for performing control so that an electric image signal is read from the buffer memory 19 and is subjected to image processing comprises the video signal processing circuit 10 and the memory controller 13. A control means for performing control so that an electric image signal is stored in a removable recording medium comprises the memory controller 13. Also, a display means for displaying a photo-taking state, such as the number of photographs which can be taken, comprises the liquid-crystal display driving circuit 21 and the intra-finder liquid-crystal display device 23.

Figure 2:
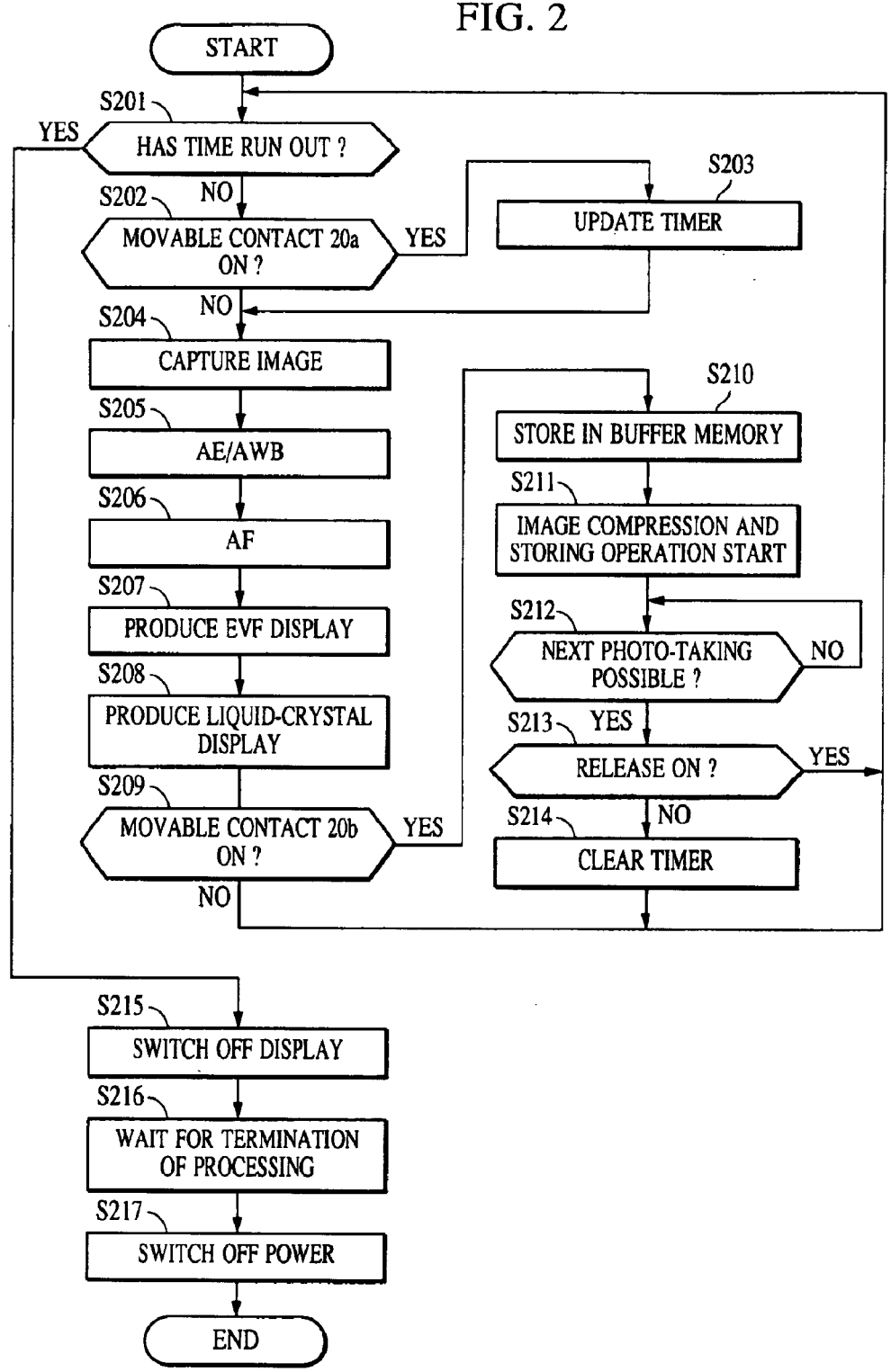
FIG. 2 is a flowchart showing the flow of the operation of the image-capturing apparatus according to the first embodiment of the present invention.

Next, a description is given of an operation in the photo-taking mode of an image-capturing apparatus according to this embodiment with reference to the flowchart in FIG. 2.

Initially, in step S201, it is determined whether or not a power-off timer inside the microcomputer 16 has reached the set time limit. When it is determined that time has run out, the process proceeds to step S215, whereby a power-off process is performed. When it is determined that time has not yet run out, the process proceeds to step S202 (when the photo-taking mode starts, the power-off timer has not yet reached the set time limit).

In step S202, it is determined whether or not one of the movable contacts (contact 20a) of the release button 20 is turned on. When it is determined that it is on, the process proceeds to step S203, whereby a process for updating the time setting in the power-off timer is performed. When, in contrast, it is not on, the process proceeds to step S204.

In step S203, after the process for updating the power-off timer is performed, the process proceeds to step S204. In step S204, the image from the CCD 6 is input by the clamping/CDS circuit 7, the AGC 8, and the A/D converter 9.

Next, the process proceeds to step S205, whereby based on the exposure conditions and the white balance information, which are outputs of the video signal processing circuit 10, control is performed so that an appropriate brightness and an appropriate color are obtained by computing and determining a gain value in the AGC 8, an f-stop number to be sent to the iris driving circuit 4, an electronic shutter value for control of the CCD 6, and R and B gains used in the video signal processing circuit 10.

Thereafter, the process proceeds to step S206, whereby the amount of lens driving is computed and determined on the basis of focusing information, which is an output of the video signal processing circuit 10, and some of the lenses of the photographic lens unit 1 are driven by using the AF driving circuit 2, thereby performing focusing adjustment.

Thereafter, the process proceeds to step S207, whereby the image signal controlled in step S205 is sent to the EVF driving circuit 11, and the image signal is displayed on the EVF monitor 12.

Thereafter, the process proceeds to step S208, whereby the photo-taking information determined in steps S205 and S206 is sent to the liquid-crystal display driving circuit 21, and the photo-taking information is displayed on the external liquid-crystal display device 22 and the intra-finder liquid-crystal display device 23. Also, the backlight of the intra-finder liquid-crystal display device 23 is switched on.

Thereafter, the process proceeds to step S209, whereby it is determined whether or not the contact 20b of the release button 20 is turned on. When it is determined that it is on, the process proceeds to step S210, whereby the image is stored. When, in contrast, it is determined that it is not on, the process returns to step S201. In step S210, the image signal is sent to the memory controller 13, and the image is temporarily stored in the buffer memory 19.

Thereafter, the process proceeds to step S211, whereby an operation is started to process an image stored in the buffer memory 19, which is not yet processed, when the load of the video signal processing circuit 10 is at a level at which image processing can be performed, to compress the image, and to store it in the memory 14. In the case of continuous photo-taking, the image is stored in the buffer memory 19 sequentially, but there are cases in which the image processing is stopped.

Thereafter, the process proceeds to step S212, whereby it is determined whether or not the photo-taking of the next frame is possible. Here, if there is a free storage area of the buffer memory 19, photo-taking of the next frame is possible, and in that case, the process proceeds to step S213.

If there is no free storage area of the buffer memory 19, photo-taking of the next frame is impossible, and the process waits for image processing, a compression process, and a storing-in-memory process for one frame to terminate.

In step S213, it is determined whether or not the contact 20a is turned on. When it is determined that it is not on, the process proceeds to the subsequent step S214, and when it is determined that it is on, the process returns to step S201.

In step S214, the power-off timer setting is cleared, and the power-off timer is set to a state in which time has run out, after which the process returns to step S201. When, in contrast, it is determined in step S201 that the power-off timer has reached a state in which time has run out, in step S215, the display of the EVF monitor 12 is turned off by the EVF driving circuit 11, and the backlight of the intra-finder liquid-crystal display device 23 is also turned off.

Thereafter, the process proceeds to step S216, whereby all of the image processing, compression, and storing in the memory, which are started in step S211, are terminated, and the process waits for the storage area of the buffer memory 19 to become free.

Thereafter, the process proceeds to step S217, whereby an instruction is issued to the power-supply section 17 so that unnecessary power supplies are switched off, and then this processing operation is terminated.

Next, the features of the image-capturing apparatus according to this embodiment are described with reference to FIG. 3 and FIGS. 4A, 4B, and 4C.

Figure 3:
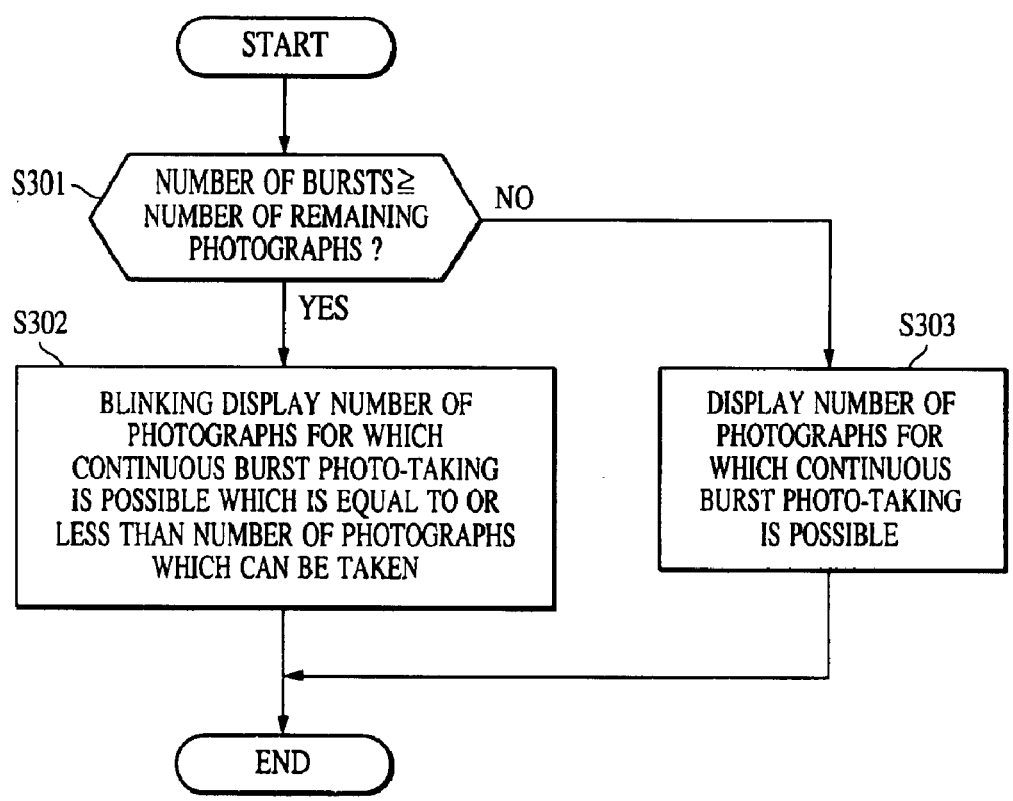
FIG. 3 is a flowchart showing the flow of the operation of the image-capturing apparatus according to the first embodiment of the present invention.
Figure 4A:
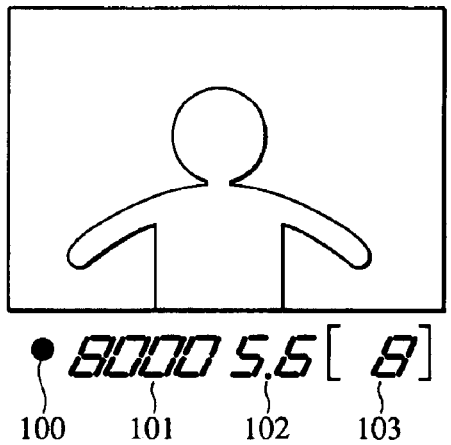
FIGS. 4A, 4B, and 4C are diagrams showing examples of displays of the image-capturing apparatus according to the first embodiment of the present invention.
Figure 4B:
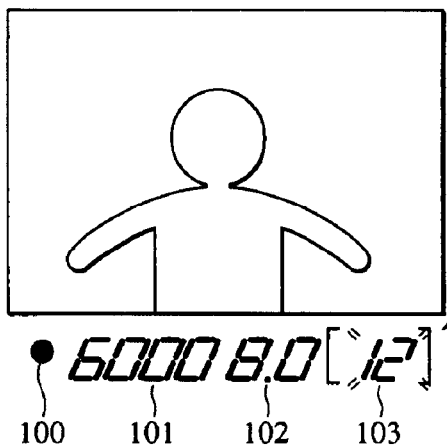
Figure 4C:
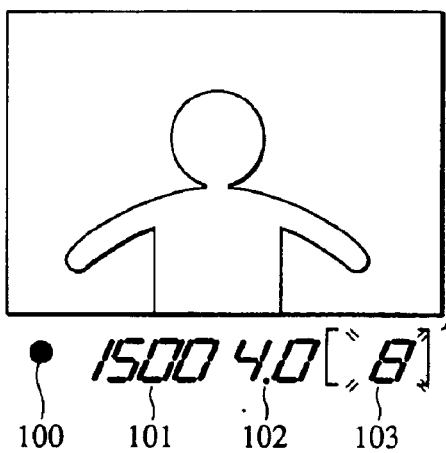

FIG. 3 is a flowchart showing the details of a process for display on the external liquid-crystal display device 22 and the intra-finder liquid-crystal display device 23, which is performed in step S208 in FIG. 2. FIGS. 4A, 4B, and 4C are diagrams showing examples of displays thereof.

In FIG. 3, initially, in step S301, the number of photographs for which continuous burst photo-taking is possible, which can be obtained from the free area of the buffer memory 19, is compared with the number of remaining photographs which can be written into the removable memory 14. When it is determined that the number of photographs for which continuous burst photo-taking is possible is equal to or greater than the number of remaining photographs which can be written into the memory 14, the process proceeds to step S302. When it is determined that the number of photographs for which continuous burst photo-taking is possible is less than the number of remaining photographs which can be written into the memory 14, the process proceeds to step S303.

In step S302, the counter display is made to blink with the upper limit of the display of photographs for which continuous burst photo-taking is possible being the number of remaining photographs. Also, in step S303, the number of photographs for which continuous burst photo-taking is possible, which can be obtained from the free area of the buffer memory 19, is placed in a blinking display state. Either when the above-described step S302 is terminated or when the above-described step S303 is terminated, this processing operation is terminated.

FIGS. 4A, 4B, and 4C are diagrams showing examples of displays in the above-described display process, in which the maximum number of frames for which continuous burst photo-taking is possible is 12.

In FIGS. 4A, 4B, and 4C, reference numeral 100 denotes a focus display section, reference numeral 101 denotes a shutter speed (in seconds) display section composed of four digits, each composed of seven segments, reference numeral 102 denotes an f-stop number display section composed of two digits, each composed of seven segments, and reference numeral 103 denotes a continuous-burst-photo-taking-capable film counter display section of two digits.

FIG. 4A shows a case in which the number of frames for which continuous burst photo-taking is possible is eight, four frames in the buffer memory 19 are not yet processed, and the number of frames which can be recorded into the memory 14 is 13 or more. In this case, the counter display section 103 shows a switched-on display state.

FIG. 4B shows a case in which the number of frames for which continuous burst photo-taking is possible is 12, the storage area of the buffer memory 19 is free, and the number of frames which can be recorded into the memory 14 is 12. In this case, the counter display section 103 has changed from the switched-on display state to a blinking display state.

FIG. 4C shows a case in which the number of frames for which continuous burst photo-taking is possible is from 8 to 12, and the number of frames which can be recorded into the memory 14 is 8. In this case, the counter display section 103 has changed from the switched-on display state to a blinking display state.

As described above, according to this embodiment, it is possible to grasp the number of photographs for which continuous burst photo-taking is possible, while at the same time grasping the number of remaining frames of a removable recording medium. The situation in which the recording area of the recording medium is filled up to its limit and the shutter release opportunity is missed can be avoided, and ease of operation is improved. Also, the relationship between two counters for the number of photographs which can be taken and the number of photographs for which continuous burst photo-taking is possible is not present in cameras using silver halide roll film, and a clear display of these matters is a technology required most strongly in electronic still cameras in the future.

In the image-capturing apparatus according to this embodiment, the functions of the above-described embodiment are realized by a computer by reading and executing a control program stored in a recording medium. However, the present invention is not limited to this example, and it is a matter of course that a case in which an OS (operating system) operating on a computer performs a part or the entirety of actual processing according to the instructions of the control program, and the functions of the above-described embodiment are realized by the processing, is included within the scope of the present invention.

As a computer program product, such as a storage medium for storing control programs, for example, a floppy disk, a hard disk, an optical disk, a magneto-optical disk, a CD-ROM (Compact Disk-Read Only Memory), a CD-R (Compact Disk Recordable), a magnetic tape, a non-volatile memory card, a ROM chip, etc., can be used.

(Second Embodiment)

A second embodiment of the present invention is described below with reference to FIG. 5.

Since the basic construction of an image-capturing apparatus according to this embodiment is the same as that of the first embodiment in FIG. 1, the description also refers to FIG. 1. Although in the above-described first embodiment, a case is shown as an example in which the display section changes from a switched-on display state to a blinking display state, in this embodiment, a display is produced in which the color of the display section is changed.

FIG. 5 is a flowchart showing the details of a display process showing the features of an image-capturing apparatus according to this embodiment, which corresponds to FIG. 3 in the above-described first embodiment.

In FIG. 5, initially, in step S501, the number of photographs for which continuous burst photo-taking is possible, which is obtained from the free area of the buffer memory 19, is compared with the number of remaining photographs which can be written into the removable memory 14. When it is determined that the number of photographs for which continuous burst photo-taking is possible is equal to or greater than the number of remaining photographs which can be written into the memory 14, the process proceeds to step S502. When it is determined that the number of photographs for which continuous burst photo-taking is possible is less than the number of remaining photographs which can be written into the memory 14, the process proceeds to step S503.

In step S502, the number of photographs for which continuous burst photo-taking is possible is displayed by changing the color (for example, red) of the counter display section with the upper limit of the display of the number of photographs for which continuous burst photo-taking is possible being the number of remaining photographs. In step S503, the number of photographs for which continuous burst photo-taking is possible, which is obtained from the free area of the buffer memory 19, is displayed by an initial color (for example, green).

Either when the above-described step S502 is terminated or when the above-described step S503 is terminated, this processing operation is terminated.

Since the remaining construction and operation/working-effects in this embodiment are the same as those of the above-described first embodiment, descriptions thereof are omitted.

(Third Embodiment)

A third embodiment of the present invention is described below with reference to FIG. 6 and FIGS. 7A, 7B, and 7C.

Since the basic construction of an image-capturing apparatus according to this embodiment is the same as that of the first embodiment in FIG. 1, the description also refers to FIG. 1. Although in the above-described first and second embodiments, a case is shown as an example in which the number of remaining photographs which can be written into the removable memory 14 and the number of photographs for which continuous burst photo-taking is possible, which is obtained from the free area of the buffer memory 19 for continuous burst photo-taking, are clearly displayed at the same time, in this embodiment, a timing at which the next photo-taking becomes possible is displayed as a display of the number of burst frames.

Figure 7A:
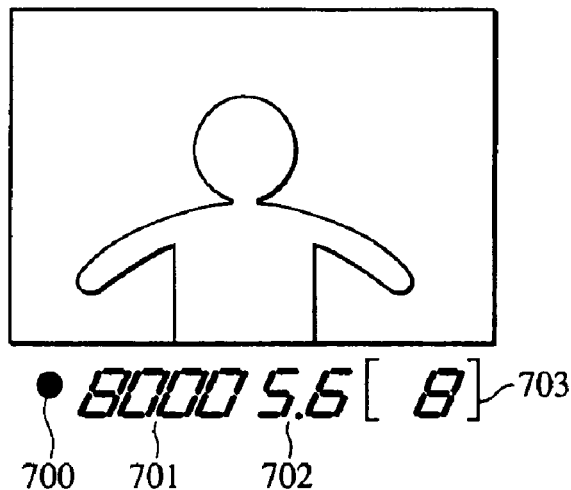
FIGS. 7A, 7B, and 7C are diagrams showing examples of displays of an image-capturing apparatus according to a third embodiment of the present invention.
Figure 7B:
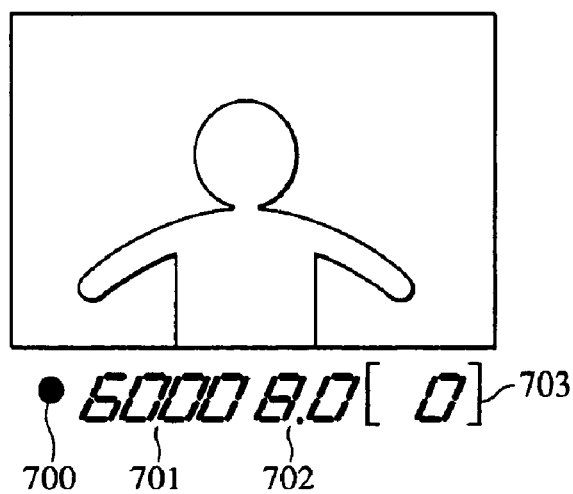
Figure 7C:
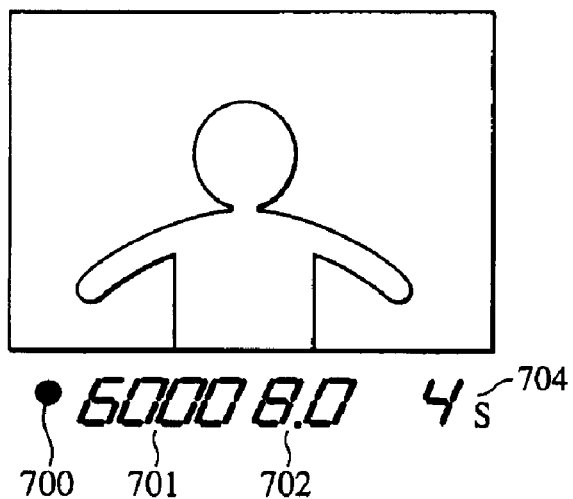

FIG. 6 is a flowchart showing the details of a display process showing the features of an image-capturing apparatus according to this embodiment, which corresponds to FIGS. 3 and 5 in the above-described first and second embodiments. FIGS. 7A, 7B, and 7C are diagrams showing examples of displays of the image-capturing apparatus according to this embodiment. In FIGS. 7A, 7B, and 7C, reference numeral 700 denotes a focus display section, reference numeral 701 denotes a shutter speed (in seconds) display section composed of four digits, each composed of seven segments, reference numeral 702 denotes an f-stop number display section composed of two digits, each composed of seven segments, and reference numeral 703 denotes a continuous-burst-photo-taking-capable film counter display section of two digits.

In FIG. 6, initially, in step S601, it is determined whether or not the storage area of the buffer memory 19 is filled up to its limit and a state is reached in which continuous burst photo-taking is impossible. When it is determined that a state is reached in which continuous burst photo-taking is impossible, the process proceeds to step S603, and when it is determined that a state is reached in which continuous burst photo-taking is possible, the process proceeds to step S602.

In step S602, as shown in FIG. 7A, the number of photographs for which continuous burst photo-taking is possible is displayed on the continuous-burst-photo-taking-capable film counter display section 703. Here, it is shown that the number of photographs for which continuous burst photo-taking is possible is eight.

In step S603, as shown in FIG. 7B, "0" is displayed on the continuous-burst-photo-taking-capable film counter display section 703, after which, as shown in FIG. 7C, the continuous-burst-photo-taking-capable film counter display section 703 is changed to a time-until-photo-taking-becomes-possible display section 704, so that a time until photo-taking becomes possible is displayed thereon. Here, it is shown that photo-taking will become possible in four seconds. The phrase "photo-taking becomes possible" here refers to a free area for one frame becoming available in the buffer memory 19. When the above-described step S602 is terminated, or when the above-described step S603 is terminated, in either case, this processing operation is terminated.

In the manner as described above, according to this embodiment, since the time when the next photo-taking will become possible becomes clear, it is easy to anticipate a shutter release opportunity, and at the same time, since the state of the image-capturing apparatus is clear, handling of the image-capturing apparatus is considerably improved. Also, in comparison with cameras using silver halide roll film, in which the next frame can be photographed by merely feeding film and releasing a shutter, electronic still cameras have a long photographing waiting time due to image processing, image compression, transfer, etc. Unlike cameras using silver halide film in which termination of a mechanical operation can be known by sound, in electronic still cameras, the time when processing will be terminated cannot be estimated, and this is more of a problem when the number of pixels is large. Therefore, the technology relating to this embodiment, such as that described above, will become even more important in the future.

Since the remaining construction and operation/working-effects in this embodiment are the same as those of the above-described first embodiment, descriptions thereof are omitted.

(Fourth Embodiment)

A fourth embodiment of the present invention is described below with reference to FIG. 8 to FIGS. 10A, 10B, and 10C.

Since the basic construction of an image-capturing apparatus according to this embodiment is the same as that of the first embodiment in FIG. 1, the description also refers to FIG. 1.

Figure 8:
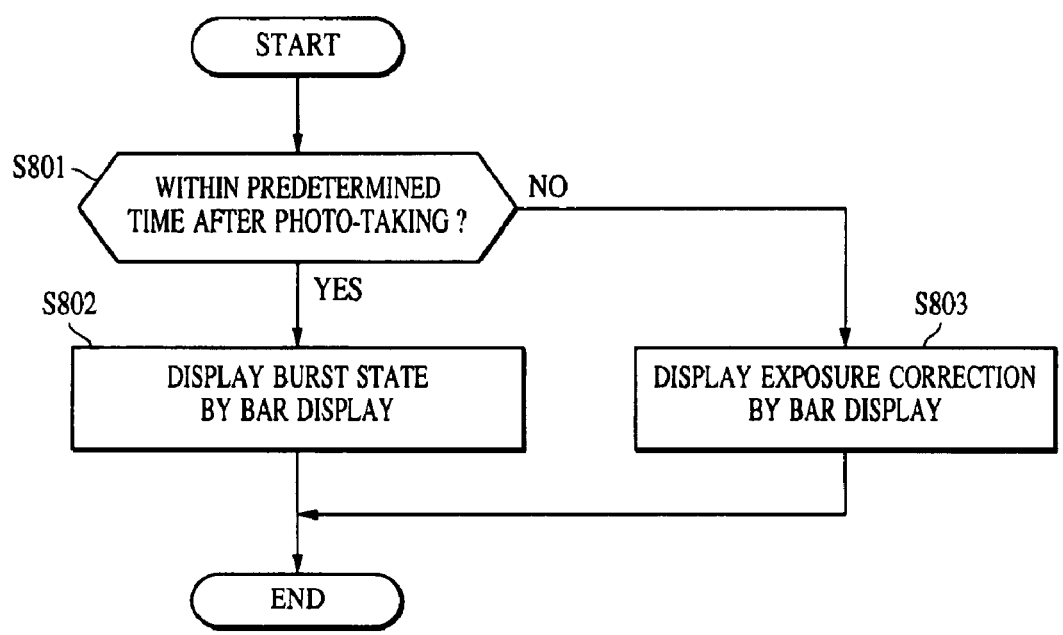
FIG. 8 is a flowchart showing the flow of the operation of an image-capturing apparatus according to a fourth embodiment of the present invention.
Figure 9A:
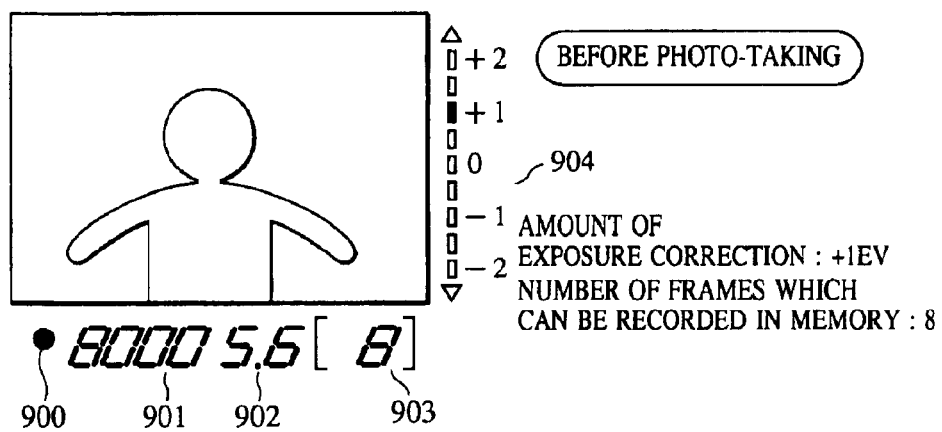
FIGS. 9A and 9B are diagrams showing examples of displays of the image-capturing apparatus according to the fourth embodiment of the present invention.
Figure 9B:
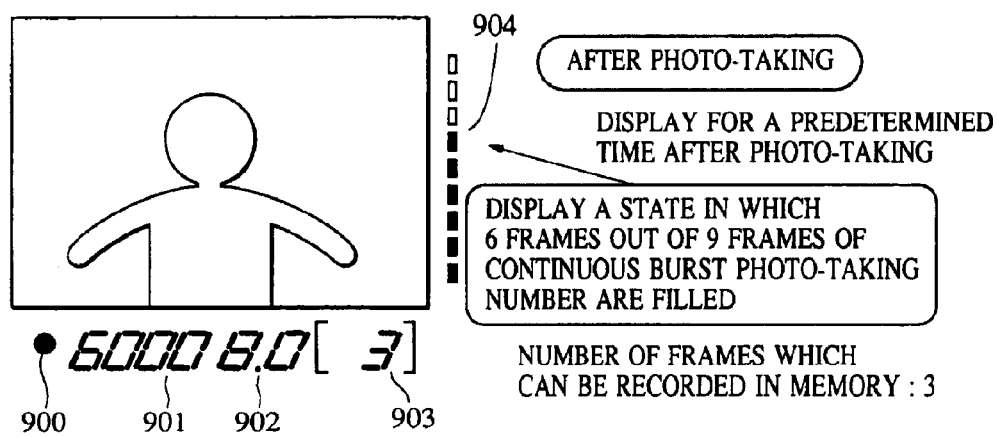
Figure 10A:
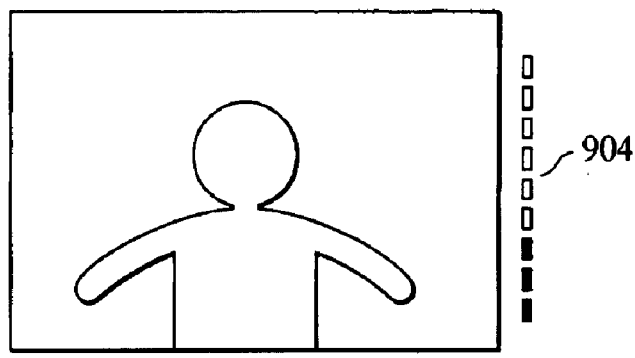
FIGS. 10A, 10B, 10C and 10D are diagrams showing examples of other displays of the image-capturing apparatus according to the fourth embodiment of the present invention.
Figure 10B:
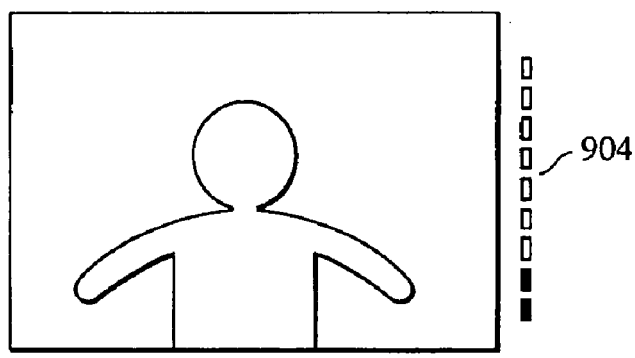
Figure 10C:
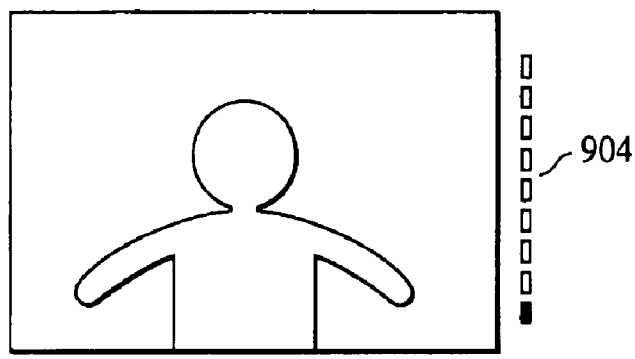
Figure 10D:
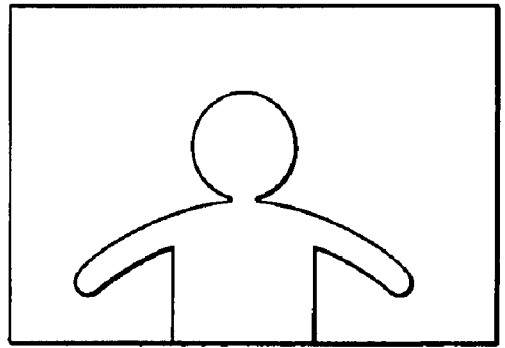

FIG. 8 is a flowchart showing the details of a display process showing the features of an image-capturing apparatus according to this embodiment, which corresponds to FIGS. 3, 5, and 6 in the above-described first, second, and third embodiments. FIGS. 9A and 9B, and FIGS. 10A, 10B, 10C and 10D are diagrams showing examples of displays. In FIGS. 9A and 9B, reference numeral 900 denotes a focus display section, reference numeral 901 denotes a shutter speed (in seconds) display section of four digits, each composed of seven segments, reference numeral 902 denotes an f-stop number display section composed of two digits, each composed of seven segments, and reference numeral 903 denotes a memory-recordable number-of-remaining-photographs display section of two digits. In FIGS. 9 and 10, reference numeral 904 denotes a bar display section.

In FIG. 8, initially, in step S801, it is determined whether or not the time is within a predetermined period after photo-taking. When it is determined that the time is not within a predetermined period after photo-taking (i.e., before photo-taking), the process proceeds to step S803, and when it is determined that the time is within a predetermined period after photo-taking (i.e., after photo-taking), the process proceeds to step S802.

In step S803, as shown in FIG. 9A, the setting amount of exposure correction is displayed on the bar display section 904. Here, it is shown that "+1EV" (EV: exposure value) is set as the amount of exposure correction. Also, a state in which continuous burst photo-taking of eight frames is possible is displayed on the memory-recordable number-of-remaining-photographs display section 903.

In step S802, as shown in FIG. 9B, the state of the buffer memory 19 is displayed on the bar display section 904 instead of the exposure correction display. Here, the maximum number of continuous burst photo-taking is nine frames, six frames out of nine frames being processed or in a state of waiting for processing, and a state in which continuous burst photo-taking of three frames is possible is displayed on the memory-recordable number-of-remaining-photographs display section 903.

Either when the above-described step S802 is terminated or when the above-described step S803 is terminated, this processing operation is terminated.

FIGS. 10A, 10B, 10C, and 10D are diagrams showing examples of displays in a process, corresponding to step S215 in FIG. 2 in the above-described first embodiment, after photo-taking in this embodiment.

Since the time set in the power-off timer has elapsed during this processing, initially, the focus display section, the shutter speed (in seconds) display section, the f-stop number display section, and the memory-recordable number-of-remaining-photographs display section are switched off. The number of photographs which can be recorded in the buffer memory 19 for continuous burst photo-taking is shown as three in FIG. 10A, two in FIG. 10B, and one in FIG. 10C, and finally, it becomes zero in FIG. 10D, and the bar display section 904 is switched off, and thus all the sections are switched off.

In the manner as described above, according to this embodiment, it is possible to display the state of continuous burst photo-taking without preparing a dedicated display member, the photo-taking possible state of the image-capturing apparatus is made clear, and handling is improved. In comparison with cameras using silver halide film, in electronic still cameras, contents for which there is a demand to be displayed, such as automatic white balance, degree of compression, preview, etc., have increased. Accordingly, the sharing of the display section, such as that described above, will become an important technology for cameras using silver halide film in the future.

Also, in a case where a display member is shared among a camera using silver halide film and an electronic still camera or a video camera, it is also possible to display information corresponding to the respective cameras. For example, it is possible to use the display member as a display member for displaying a film state in the silver halide camera, for displaying the state of a buffer memory for continuous photo-taking in the electronic still camera, and for displaying the amount of remaining recording tape in the video camera.

In addition, in a case where the display section is used for a hybrid camera for recording on silver halide film and in semiconductor memory, in which a camera section is shared, it is also possible to selectively switch the display contents according to the selection of the recording medium and the switching of the photo-taking mode.

Since the remaining construction and operation/working-effects in this embodiment are the same as those of the above-described first embodiment, descriptions thereof are omitted.

The individual components shown in schematic or block form in the Drawings are all well known in the camera arts and their specific construction and operation are not critical to the operation or best mode for carrying out the invention.

For example, the software structure and the hardware construction of the above embodiments can be substituted appropriately.

In the present invention, each of the above-described embodiments or technological elements thereof may be combined as required. Also, the present invention as claimed, or the entirety or part of the construction of the embodiments may form one apparatus, may be coupled with another apparatus, or may be elements which constitute an apparatus.

In addition, the present invention can be applied to a variety of types of cameras, such as video-movie cameras, video still cameras, single-lens reflex cameras, lens shutter cameras, or monitor cameras, to image-capturing apparatuses other than cameras, image reading apparatuses, optical apparatuses, and other apparatuses, can be applied to apparatuses which are used in these cameras, image-capturing apparatuses, image reading apparatuses, the optical apparatuses, and other apparatuses, and can be applied to elements which constitute these apparatuses, to a method for controlling these apparatuses, and to a computer program product for providing the control method.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications, equivalent structures and functions.

What is claimed is:

1. An apparatus for capturing a photographic image, storing the captured image in a buffer memory, reading the image stored in said buffer memory, and recording the read image on a recording medium, said apparatus comprising:

a bar-type indication display device for indicating on a display an adjustment value of exposure before shooting; and a control device for controlling said display device to change the display within a predetermined period of time after the shooting according to a remaining number of images which can be recorded on said buffer memory.

2. An apparatus according to claim 1, wherein said control device causes said display device to display the remaining number of images which can be recorded on said recording medium when the remaining number of images which can be recorded on said recording medium is less than the remaining number of images which can be stored in said buffer memory.

3. An apparatus according to claim 1, wherein said apparatus comprises an image pickup apparatus.

* * * * *

UNITED STATES PATENT AND TRADEMARK OFFICE
CERTIFICATE OF CORRECTION

PATENT NO. : 6,862,106 B1
DATED : March 1, 2005
INVENTOR(S) : Hiroshi Matsushima It is certified that error appears in the above-identified patent and that said Letters Patent is hereby corrected as shown below:

<u>Column 2,</u>
Line 17, "Image-stored" should read -- image-stored --.

Signed and Sealed this

Second Day of August, 2005

JON W. DUDAS
*Director of the United States Patent and Trademark Office*